(12) United States Patent
Gupta et al.

(10) Patent No.: US 11,636,274 B2
(45) Date of Patent: Apr. 25, 2023

(54) SYSTEMS AND METHODS TO IDENTIFY MOST SUITABLE GRAMMAR SUGGESTIONS AMONG SUGGESTIONS FROM A MACHINE TRANSLATION MODEL

(71) Applicant: Google LLC, Mountain View, CA (US)

(72) Inventors: Shruti Gupta, Bengaluru (IN); Jayakumar Hoskere, Bengaluru (IN)

(73) Assignee: Google LLC, Mountain View, CA (US)

( * ) Notice: Subject to any disclaimer, the term of this patent is extended or adjusted under 35 U.S.C. 154(b) by 126 days.

(21) Appl. No.: 16/922,951

(22) Filed: Jul. 7, 2020

(65) Prior Publication Data
US 2021/0357599 A1 Nov. 18, 2021

(30) Foreign Application Priority Data
May 14, 2020 (IN) .............. 202041020306

(51) Int. Cl.
*G06F 40/58* (2020.01)
*G06F 40/253* (2020.01)
*G06F 40/211* (2020.01)
*G06F 40/166* (2020.01)
*G06F 40/30* (2020.01)

(52) U.S. Cl.
CPC ............ *G06F 40/58* (2020.01); *G06F 40/166* (2020.01); *G06F 40/211* (2020.01); *G06F 40/253* (2020.01); *G06F 40/30* (2020.01)

(58) Field of Classification Search
None
See application file for complete search history.

(56) References Cited

U.S. PATENT DOCUMENTS

| 6,085,206 A * | 7/2000 | Domini ............... G06F 40/232 715/257 |
| 6,434,523 B1 | 8/2002 | Monaco |
| 7,003,444 B2 * | 2/2006 | Weise ................. G06F 40/253 715/256 |

(Continued)

OTHER PUBLICATIONS

Duc Tam Hoang et al., Exploiting N-Best Hypotheses to Improve an SMT Approach to Grammatical Error Correction, Cornell University, Computer Science, Computation and Language, arXiv: 1606.00210 [cs.CL], Submitted on Jun. 1, 2016, 7 pages.

(Continued)

*Primary Examiner* — Jesse S Pullias
(74) *Attorney, Agent, or Firm* — Lowenstein Sandler LLP

(57) ABSTRACT

A set of candidate edits for a word of a sentence is obtained. Each of the set of candidate edits includes an edit word. Two or more surrounding words that each have a dependency relationship with the edit word are identified in the sentence. At least one of the two or more surrounding words is identified irrespective of their proximity to the edit word. The dependency relationship between the edit word and each of the surrounding words and the set of candidate edits is provided as input to a grammar accuracy prediction model. One or more outputs of the grammar accuracy prediction model are obtained. The one or more outputs indicate grammatical accuracy of each candidate edit from the set in the sentence in view of the dependency relationship with surrounding words. The candidate edit with highest accuracy is selected from the candidate edit set for the sentence.

20 Claims, 8 Drawing Sheets

(56) References Cited

U.S. PATENT DOCUMENTS

| | | | |
|---|---|---|---|
| 2005/0234705 A1* | 10/2005 | Humphreys | G06F 40/56 704/5 |
| 2009/0055168 A1* | 2/2009 | Wu | G06F 40/216 704/E11.001 |
| 2009/0192787 A1* | 7/2009 | Roon | G06F 40/216 715/256 |
| 2015/0186355 A1* | 7/2015 | Baldwin | G06F 40/232 704/9 |
| 2016/0062981 A1 | 3/2016 | Dogrultan et al. | |
| 2017/0286376 A1 | 10/2017 | Mugan | |
| 2018/0121799 A1* | 5/2018 | Hashimoto | G06N 3/0454 |

OTHER PUBLICATIONS

PCT International Search Report and Written Opinion for International Application No. PCT/US2021/032532 dated Aug. 31, 2021, 16 pages.

Eric Malmi et al., "Encode, Tag, Realize: High-Precision Text Editing", Arxiv.org, Cornell University Library, Sep. 3, 2019, 7 pages.

"India Office Action for Application No. 20204102030 dated Feb. 25, 2022, 7 pages.".

* cited by examiner

| WORD | DEP STATUS | DEP POINTER | DEP ACCURAC. | POS LABEL | FEATURE LABEL | CONTEXT ACCURAC. | FLUENCY | USAGE FREQ. |
|---|---|---|---|---|---|---|---|---|
| EXPLAINS | CHILD, PARENT | "LISTS", "NEED" | YES | VERB | PLURAL | NO | YES | 200,405 |
| ⋯ | ⋯ | ⋯ | ⋯ | ⋯ | ⋯ | ⋯ | ⋯ | ⋯ |
| EXPLAIN | CHILD, PARENT | "LISTS", "NEED" | NO | VERB | SINGLUAR | YES | YES | 603,830 |
| EXPLAINED | CHILD, PARENT | "LISTS", "NEED" | NO | VERB | NA | NO | NO | 1,503 |
| EXPLAINER | CHILD, PARENT | "LISTS", "NEED" | NO | NOUN | NA | NO | NO | 4 |

SYSTEMS AND METHODS TO IDENTIFY MOST SUITABLE GRAMMAR SUGGESTIONS AMONG SUGGESTIONS FROM A MACHINE TRANSLATION MODEL

RELATED APPLICATIONS

This application claims the benefit under 35 U.S.C. § 119(a) of Indian Provisional Patent Application No. 202041020306, filed May 14, 2020, in the Indian Patent Office, which is incorporated by reference herein in its entirety.

TECHNICAL FIELD

Aspects and implementations of the present disclosure relate to identifying most suitable grammar suggestions among suggestions from a machine translation model.

BACKGROUND

Grammar error correction systems are used to correct grammatical mistakes present in sentences provided by a user of a platform. A grammar error correction system can identify a set of candidate edits to replace a word or phrase in a user-provided sentence. In some instances, the candidate edit suggestions come from a machine translation model, which identifies a set of suitable replacements for a word or phrase in the sentence (e.g., a replacement word or phrase that a user is likely to accept for the sentence).

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed for selecting a recommended edit to a sentence based on a grammatical accuracy of each edit in a set of candidate edits. In an implementation, a set of candidate edits are obtained for a sentence. Dependency relationships (i.e., syntactic and/or semantic relationships) between the candidate edit and its surrounding words in the sentence are provided as input to a machine learning model to predict the candidate edit that is most likely to be grammatically correct for the sentence. The machine learning model outputs a score indicating the grammatical accuracy for each candidate edit from the set of candidate edits in the sentence in view of the relationships between the candidate edit and its surrounding words. The candidate edit with highest score is selected as the recommended grammatical correction for the sentence.

In some implementations, a system and method are disclosed for training a machine learning model to determine accuracy of suggested edits to contents of a document. In an implementation, training data is generated for the machine learning model. To generate the training data, a sentence that was corrected is identified. A word that was replaced with an edited word in the corrected sentence is also identified. A training input is generated including the edited word, the original word, and the dependency relationship between the edited word, the original word, and other words in the sentence. The ML model output includes an indication of whether the edited word in the corrected sentence is grammatically accurate in view of the dependency relationship between the edited word and each of the one or more second words. The training data is provided to the machine learning model to predict how grammatically accurate an edit is for a given sentence.

BRIEF DESCRIPTION OF DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 4B illustrates a grammatical attributes data structure for a sentence, in accordance with implementations of the present disclosure.

DETAILED DESCRIPTION

Figure 1:
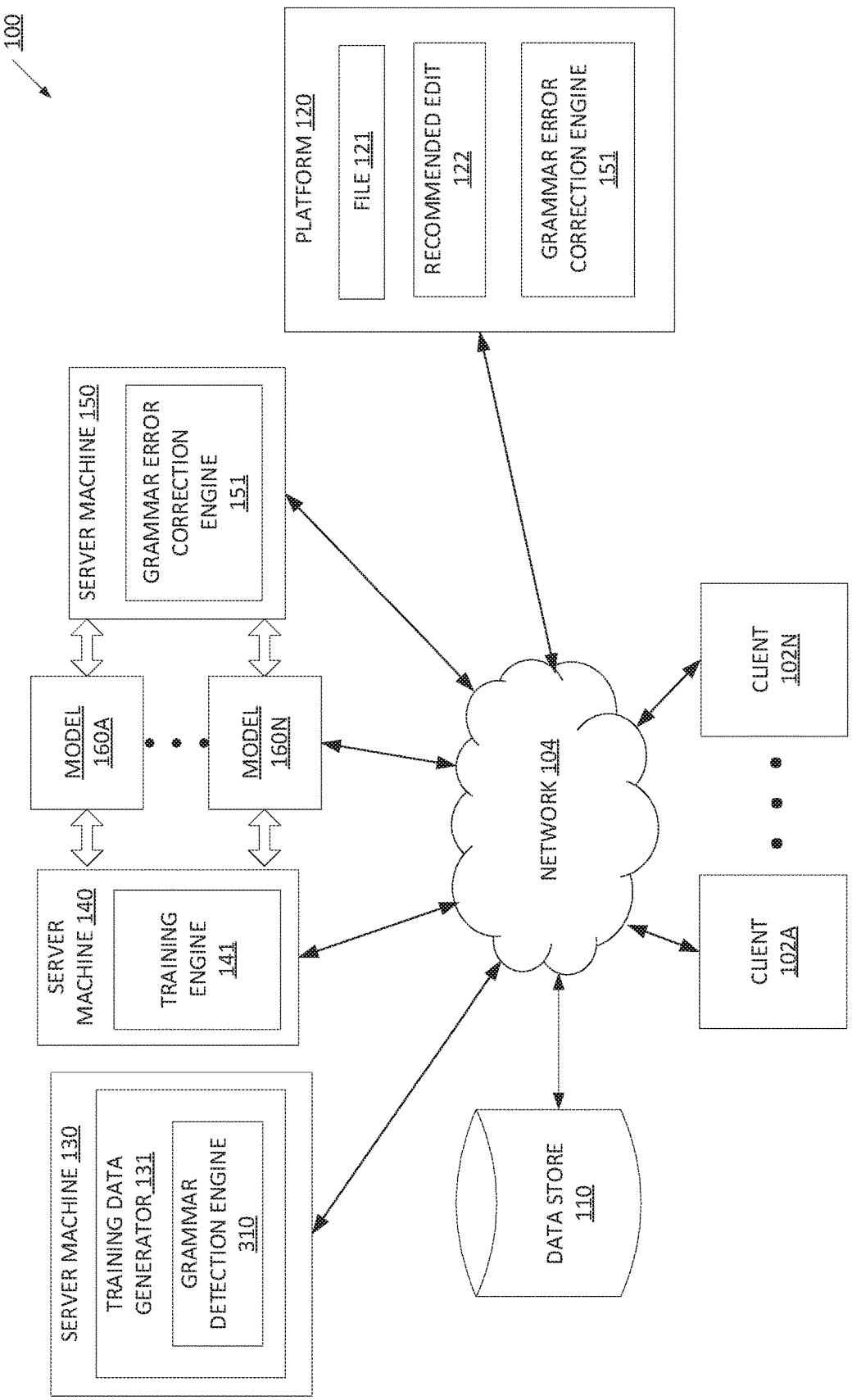
FIG. 1 illustrates an example system architecture, in accordance with implementations of the present disclosure.

Aspects of the present disclosure relate to identifying the most likely of all candidate edits to improve a grammatical correctness of a sentence. Grammar error correction systems are frequently used to correct grammatical mistakes present in sentences provided by a user of a platform (e.g., a document editing platform, an electronic mail (e-mail) platform, an electronic messaging platform, etc.).

A grammar error correction system may use machine translation (MT) models (e.g., a statistical MT model, a neural MT model, etc.), which are models whose parameters are derived from the analysis of phrases to accomplish translation from one language to another. The grammar error correction system may use an MT model to identify a set of candidate grammar-related edits to replace a word or a phrase in a user-provided sentence. In some instances, a MT model can identify a set of grammar-related candidate edits for a particular word of a sentence by identifying one or more pre-defined (e.g., previously recorded) candidate edits associated with the particular word. The MT engine can further identify the set of candidate edits based on a likelihood that a user will accept the edit as a recommended edit for the user-provided sentence. In some instances, the MT model can determine a likelihood that a user will accept the edit based on an immediate context of the candidate edit in the user-provided sentence. The grammar error correction system can also include a language model. The language model can determine, for each of the set of candidate edits identified by the MT engine, a probability or likelihood that a particular candidate edit is used in files (e.g., electronic document files, e-mail files, etc.) of the platform.

Conventionally, grammar error correction systems make suggestions of recommended edits by determining, from a set of candidate edits, the particular edit that has the highest likelihood of user acceptance and is most frequently used in files of the platform. As described above, a likelihood of user acceptance is based on an immediate context of a candidate edit in a user-provided sentence, rather than a global context (i.e., a context for a word or phrase in view of the entire sentence) of the candidate edit in the user-provided sentence. As such, a particular candidate edit can be associated with a highest likelihood of user acceptance, compared to other candidate edits in the set, even though the particular candidate edit is not grammatically accurate given the global context of the candidate edit. By recommending grammatically inaccurate edits to a user-provided sentence, conventional grammar error correction systems are unable to improve the grammar of the user-provided sentence, thereby reducing an overall effectiveness of grammar error correction.

In some instances, the set of candidate edits can include the word or phrase originally provided in the user sentence. The candidate edit including the original word or phrase can be grammatically accurate, however, may not be frequently used in files of the platform. As a result, a conventional grammar error correction system can select a different candidate edit from the set of candidate edits as a recommended edit to a user-provided sentence, even though the user-provided sentence is grammatically accurate without the recommended edit. By providing an unnecessary recommended edit to a user-provided sentence that is already grammatically accurate, a user experience with the platform can be negative (e.g., a user can be annoyed that the platform is providing a recommendation to a sentence that is grammatically accurate). In addition, a significant amount of computing resources are wasted by the grammar error correction system and an overall latency of the grammar error correction system, as well as the platform, is increased, thereby negatively affecting overall system efficiency.

Implementations of the present disclosure address the above and other deficiencies by providing a machine learning model that re-evaluates candidate edits from an MT model for a user-provided sentence in view of a grammatical accuracy of each of the candidate edits. In response to a user providing a sentence to a platform (e.g., a document editing platform, an e-mail platform, etc.), a particular word of the user-provided sentence can be identified and a set of candidate edits for the word can be obtained (e.g., from an MT model that was used to check the user-provided sentence for grammar accuracy). A processing device can identify one or more grammatical attributes associated with the user-provided sentence and each of the set of candidate edits. For example, the processing device can identify a dependency relationship (e.g., a syntactic dependency relationship, a semantic dependency relationship, etc.) between each of the set of candidate edits and two or more additional words (words surrounding each candidate edit) in the user-provided sentence. The dependency relationship between each of the candidate edits and at least one of the two or more surrounding words can be identified irrespective of a proximity of a corresponding surrounding word to the edited word (i.e., by using words of the entire sentence, and just the words immediately following and preceding the original word or those from the same phrase). The processing device can provide the dependency relationship and each of the set of candidate edits as an input to a machine learning model trained to determine a grammatical accuracy for each of the candidate edits. The processing device can receive one or more outputs from the trained machine learning model, where each of the one or more outputs indicate a grammatical accuracy of each candidate edit in the user-provided sentence. The processing device can select a candidate edit as a recommended edit based on the grammatical accuracy for each of the set of candidate edits.

The machine learning model can be trained using training data collected for previously corrected sentences. In some embodiments, a previously corrected sentence can be a sentence corrected by an accepted linguistic authority (e.g., a professional linguist). In other or similar embodiments, a previously corrected sentence can be a user-provided sentence that was previously provided to the platform and corrected using a grammar error correction system. The training data can include training inputs and associated target outputs. Training inputs can be generated using original words that were edited in corrected sentences, as well as additional words that each have a dependency relationship with the edited word, where such additional words can be identified irrespective of their proximity to the corresponding edited word. Target outputs can be generated for the associated training inputs based on an indication of whether an edited word in each corrected sentence is grammatically accurate in view of the dependency relationship between the edited word and each of the respective additional words.

Accordingly, aspects of the present disclosure re-evaluate grammar suggestions from a machine translation model to ensure that only edits that are grammatically correct in the context of the entire sentence are provided to a user of a platform. By determining a grammatical accuracy based on a dependency relationship between an original word to be edited in the sentence and two or more additional words of the sentence, where the additional words are identified irrespective of their proximity to the original word, a candidate edit can be selected to be recommended to a user based on a global context of the sentence rather than an immediate context. By selecting a candidate edit to be recommended to a user based on the global context of the sentence, an overall accuracy of recommended edits provided by the platform improves, thereby increasing overall effectiveness of the grammar error correction system.

Further, by using dependency relationships (i.e., a syntactic and/or semantic relationships) of a word with other words of the sentence to determine an accuracy of a candidate edit, a weight that usage frequency of a particular candidate edit when selecting a recommended edit is reduced. As a result, an edit is not recommended for an original word of the sentence that is already grammatically accurate, even though the original word is not frequently used in files of the platform, thereby reducing the number of unnecessary suggestions and the amount of wasted computing resources. As a result, an overall quality of the grammar error correction system is increased. Further, an overall latency of the grammar error correction system decreases and an overall system efficiency is increased.

FIG. 1 illustrates an example system architecture 100, in accordance with implementations of the present disclosure. The system architecture 100 (also referred to as "system" herein) includes client devices 102A-N, a data store 110, a platform 120, and one or more server machines 130-150, each connected to a network 104.

In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing content items as well as data structures to tag, organize, and index the content items. Data store 110 may be hosted by one or more storage devices, such as main memory, magnetic or optical storage based disks, tapes or hard drives, NAS, SAN, and so forth. In some implementations, data store 110 may be a network-attached file server, while in other embodiments data store 110 may be some other type of persistent storage such as an object-oriented database, a relational database, and so forth, that may be hosted by platform 120 or one or more different machines coupled to the platform 120 via network 104.

Client devices 102A-N can each include computing devices such as personal computers (PCs), laptops, mobile phones, smart phones, tablet computers, netbook computers, network-connected televisions, etc. In some implementations, client devices 102A-N may also be referred to as "user devices." Each client device can include a content viewer. In some implementations, a content viewer can be an application that provides a user interface (UI) for users to view, create, or edit content of a file 121, such as an electronic document file, an electronic message file (e.g., an e-mail file), an image file, a video file, etc. For example, the content viewer may be a web browser that can access, retrieve, present, and/or navigate files 121 served by a web server. The content viewer may render, display, and/or present the content of a file 121 to a user. In one example, the content viewer may be a standalone application (e.g., a mobile application or app) that allows users to view, edit, and/or create digital content items (e.g., electronic documents, electronic messages, digital video items, digital images, electronic books, etc.). In some implementations, the content viewer may be an electronic document platform application for users to generate, edit, and/or upload content for electronic documents on the platform 120. In other or similar implementations, the content viewer may be an electronic messaging platform application (e.g., an electronic mail (e-mail) application) for users to generate and send messages via platform 120. As such, the content viewers may be provided to the client devices 102A-102N by platform 120.

In some implementations, platform 120 and/or server machines 130-150 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to a file 121 (e.g., an electronic document, an e-mail message, etc.) and/or provide the file 121 to the user. For example, platform 120 may be an electronic document platform. The electronic document platform may allow a user to create, edit (e.g., collaboratively with other users), access or share with other users an electronic document stored at data store 110. In another example, platform 120 may be an electronic messaging platform (e.g., e-mail platform). The electronic messaging platform may allow a user to create, edit, or access electronic messages (e.g., e-mails) addressed to other users of the electronic messaging platform or users of client devices outside of the electronic messaging platform. Platform 120 can also include a website (e.g., a webpage) or application back-end software that can be used to provide a user with access to files 121.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the platform 120.

As described previously, platform 120 can allow a user to create or edit a file 121 (e.g., an electronic document file, an e-mail file, etc.) via a user interface of a content viewer. Each user created file 121 can be stored at data store 110. In one example, a user can provide, via the user interface, one or more sentences to be included in a file 121. In some instances, a user-provided sentence can include one or more errors that cause the sentence to be grammatically inaccurate. A sentence is grammatically inaccurate if a word or phrase of the sentence, given a global context of the word or phrase, causes the sentence to violate one or more grammatical rules for a particular language (e.g., English) of the sentence. For example, instead of providing the sentence "I walked to the store and bought milk," or "I walk to the store and buy milk," a user can provide the sentence "I walk to the store and bought milk." In this example, given the context of the user-provided sentence, the words "walk" and "bought" together in the sentence cause the sentence to be grammatically inaccurate.

In some implementations, a recommendation system can be configured to identify a word or phrase of a sentence that cause a sentence to be grammatically inaccurate and recommend edits 122 to the sentence to cause the sentence to become grammatically accurate (i.e., the sentence satisfies the one or more grammatical rules for the particular language). A recommended edit 122 can be an indicator (e.g., interface component, electronic message, recommendation feed, etc.) that provides a user with suggestions of edits that may cause a user-provided sentence to be grammatically correct. The recommendation system can include at least a grammar detection engine 310, a training data generator 131, a training engine 141, a machine learning model 160, and a grammar error correction engine 151. In some implementations, a recommended edit 122 can be based on an output of a trained machine learning model, such as machine learning models 160A-N.

Server machine 130 can include a training set generator 131 that is capable of generating training data (e.g., a set of training inputs and a set of target outputs) to train ML models 160A-N. Training data can be generated based on sentences that have been previously corrected by one or more edits. In some implementations, one or more of the previously corrected sentences can be sentences that were previously corrected by an accepted linguistic authority (e.g., a professional linguist). For example, data store 110 can store (e.g., in a data structure) sentences including one or more grammatical errors that were corrected by a professional linguist. Data store 110 can also store an indication of one or more words of the sentence that were edited in view of one or more grammatical rules. For example, the data store 110 can store an indication of the original word included in the sentence and an edited form of the original word (i.e., the edited word) provided by the accepted linguistic authority, that resulted in the sentence becoming grammatically correct.

In other or similar embodiments, training data can be generated based on previously corrected user-provided sentences. For example, a user can provide platform 120 with a sentence, in accordance with previously described embodiments. Platform 120 can provide a recommended edit 122 for a word of the sentence to a client device 102A-N of the user, where the client device 102A-N presents the recommended edit 122 to the user via a user interface. The user can accept or reject the recommended edit 122, for example, by selecting a user interface element of the user interface. The client device 102A-N can transmit an indication of acceptance or rejection to platform 120. In response to receiving the indication, platform 120 can store the sentence, the recommended edit 122, and the indication of acceptance or rejection at data store 110.

Training data generator 131 can generate a set of training data by identifying data corresponding to previously corrected sentences stored at data store 110. The set of training data can include a subset of training inputs and target outputs based on the identified data. In some embodiments, training data generator 131 can obtain one or more grammatical attributes for each of the previously corrected sentences using a grammar detection engine 310. Further details regarding grammar detection engine 310 are provided with respect to FIG. 3. In some implementations, each of the subset of training inputs can include a portion of an original sentence prior to the original sentence being corrected, the edit made to the previously corrected sentence that resulted in the sentence being grammatically correct, and one or more grammatical attributes of the previously corrected sentence and/or the corrected sentence. Each of the subset of target outputs can include data pertaining to whether the edit to the previously corrected sentence is grammatically accurate. In some implementations, an edit is determined to be grammatically accurate if an accepted linguistic authority provided the edit to the previously corrected sentence. In other or similar implementations, the edit is determined to be grammatically accurate if a user that provided the previously corrected sentence accepted a recommended edit 122 to the sentence, in accordance with previously described embodiments. Further details regarding the generation of training data are provided herein.

Server machine 140 may include a training engine 141. Training engine 141 may train a machine learning model 160A-N using the training data from training set generator 131. The machine learning model 160A-N may refer to the model artifact that is created by the training engine 141 using the training data that includes training inputs and corresponding target outputs (correct answers for respective training inputs). The training engine 141 may find patterns in the training data that map the training input to the target output (the answer to be predicted), and provide the machine learning model 160A-N that captures these patterns. The machine learning model 160A-N may be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model may be trained by, for example, adjusting weights of a neural network in accordance with a backpropagation learning algorithm or the like. For convenience, the remainder of this disclosure will refer to the implementation as a neural network, even though some implementations might employ an SVM or other type of learning machine instead of, or in addition to, a neural network. In one aspect, the training set is obtained by training set generator 131 hosted by server machine 130. In some embodiments, the machine learning model 160 can be an edit accuracy model, described with respect to FIG. 2.

Server 150 includes a grammar error correction engine 151 that provides a portion of a user-provided sentence as input to a first trained machine learning model 160A-N to obtain one or more outputs. The first model (e.g., a MT model) can be used to determine a set of candidate edits for one or more portions of a user-provided sentence. The first model can further be used to determine, for each candidate edit, a likelihood that a user will accept the candidate edit to the user-provided sentence. Each of the set of candidate edits can be provided to a second machine learning model (e.g., an edit accuracy model). One or more grammatical attributes associated with the user-provided sentence and each candidate edit can be provided as an input to the second machine learning model. The second machine learning model can provide one or more outputs indicating a grammatical accuracy for each of a set of candidate edits for the user-provided sentence. Grammar error correction engine 151 can select a candidate edit from the set of candidate edits for the user-provided sentence to be provided as a recommended edit 122 to the user based on the grammatical accuracy for each of the set of candidate edits. For example, grammar error correction engine 151 can select a candidate edit having a highest grammatical accuracy compared to a grammatical accuracy for each other candidate edit of the set of candidate edits to be provided as a recommended edit to the user. Further details regarding grammar error correction engine 151 are provided with respect to FIG. 2.

It should be noted that in some other implementations, the functions of server machines 130, 140, and 150 or platform 120 may be provided by a fewer number of machines. For example, in some implementations server machines 130 and 140 may be integrated into a single machine, while in other implementations server machines 130, 140, and 150 may be integrated into multiple machines. In addition, in some implementations one or more of server machines 130, 140, and 150 may be integrated into platform 120.

In general, functions described in implementations as being performed by platform 120 or server machines 130, 140, 150 can also be performed on the client devices 102A-N in other implementations, if appropriate. In addition, the functionality attributed to a particular component can be performed by different or multiple components operating together. Platform 120 or server machines 130, 140, 150 can also be accessed as a service provided to other systems or devices through appropriate application programming interfaces, and thus is not limited to use in web sites.

Although implementations of the disclosure are discussed in terms of platform 120 and providing access to a file 121 on platform 120, implementations may also be generally applied to any type of grammar error correction system configured to correct a sentence provided by a user. Implementations of the disclosure are not limited to platforms that provide access to electronic documents or electronic messages to users.

In situations in which the systems discussed here collect personal information about users, or may make use of personal information, the users may be provided with an opportunity to control whether platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the platform 120.

Figure 2:
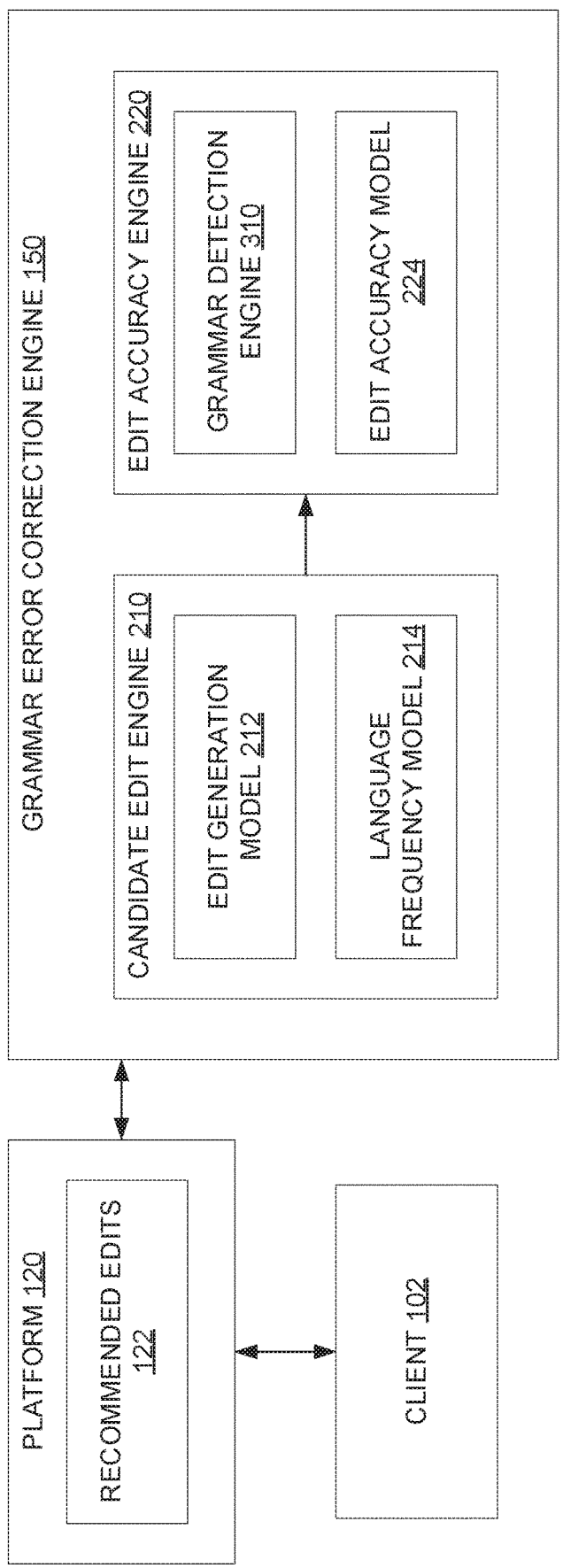
FIG. 2 is a block diagram of a grammar error correction engine, in accordance with implementations of the present disclosure.
Figure 4A:
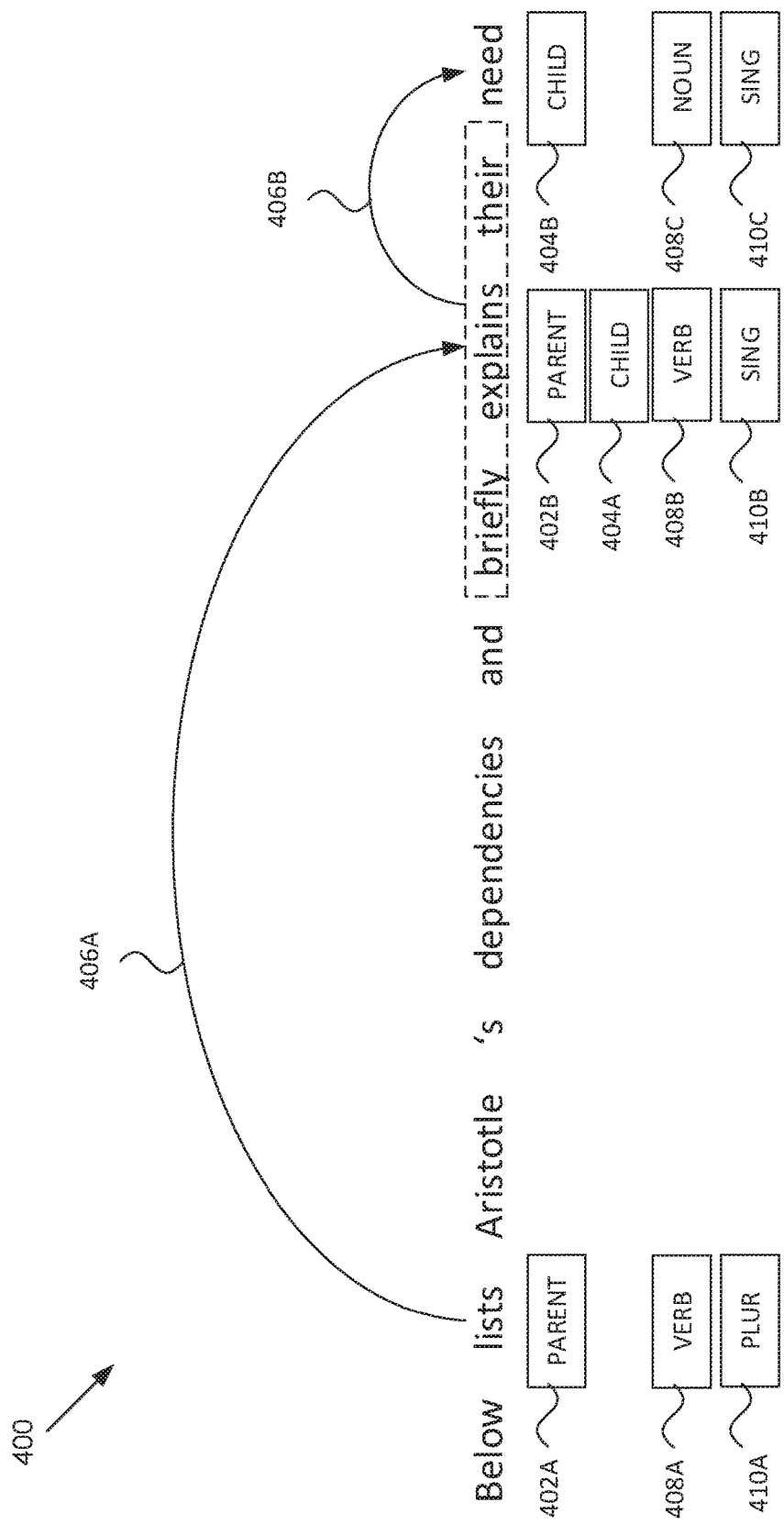
FIG. 4A illustrates a user-provided sentence, in accordance with implementations of the present disclosure.

FIG. 2 is a block diagram of a grammar error correction engine, in accordance with implementations of the present disclosure. In some embodiments, the grammar error correction engine can be grammar error correction engine 151 of FIG. 1. As described previously, grammar error correction engine 151 can determine a recommended edit 122 for one or more portions of a sentence provided by a user of platform 120 via a client device 102. For example, a user can provide sentence 400 as illustrated in FIG. 4A (i.e., "Below lists Aristotle's dependencies and briefly explains their need."). It should be noted that some embodiments described herein are directed to providing a recommended edit to a word of a user-provided sentence. However, grammar error correction engine 151 can provide a recommended edit 122 for any portion of a user-provided sentence, including a word, multiple words, a phrase, etc.

Grammar error correction engine 151 can include a candidate edit engine 210 and an edit accuracy engine 220. Candidate edit engine 210 can be configured to identify a set of one or more candidate edits that could be recommended as an edit to a portion of a user-provided sentence. As described previously, a user can provide a sentence to platform 120 via client device 102. Candidate edit engine 210 can parse the user-provided sentence to identify one or more words or phrases of the sentence. In accordance with the previous example, candidate edit engine 210 can identify the word "explains" of sentence 400. Each of the identified words or phrases can be provided to an edit generation model 212. In some embodiments, edit generation model 212 can be a MT model (e.g., a statistical MT model, a neural MT model, etc.).

Edit generation model 212 is a model configured to identify, for a particular word or phrase, a set of candidate edits that each could be applied to the particular word or phrase in the user provided sentence. In some embodiments, edit generation model 212 can be a trained machine learning model configured to receive, as an input, a particular word or set of words from a user-provided sentence and provide, as an output, a set of candidate edits that could be applied to the particular word or set of words. Edit generation model 212 can also provide, as an additional output, an indication of a likelihood that a user presented with each of the set of candidate edit will accept a particular candidate edit as a recommended edit 122 for the user-provided sentence.

In some embodiments, edit generation model 212 can identify the set of candidate edits based on a pre-defined set of candidate edits associated with the particular word or phrase. In some embodiments, each of the set of candidate edits can correspond to a potential corrected form of a word of the sentence. In accordance with the previous example, candidate edit engine 210 can identify the word "explains" from sentence 400 and provide the word "explains" to the edit generation model 212. Edit generation model 212 can identify (e.g., using a look-up table or other suitable data structure or database) a set of candidate pre-defined candidate edits associated with the word "explains." For example, edit generation model 212 can provide, as an output, the set of candidate edits including "explain," "explains," "explained," "explainer," etc. Edit generation model 212 can also determine, for each of the set of candidate edits, a likelihood that a user will accept the edit as a recommended edit 122 for the user-provided sentence. In some embodiments, edit generation model 212 can determine the likelihood of user acceptance based on an immediate context of the particular word (i.e., a context of the particular word in view of words immediately surrounding the particular word). In other or similar embodiments, edit generation model 212 can determine the likelihood of user acceptance based on historical data associated with a candidate edit. For example, edit generation model 212 can determine the likelihood of user acceptance based on historical data indicating a number of users that have previously accepted or rejected a particular candidate edit for the particular word in the sentence.

For purposes of illustration only, edit generation model 212 can determine that a first candidate edit including the word "explain" is associated with a highest likelihood, a second candidate edit including the word "explains" is associated with a second highest likelihood, a third candidate edit including the word "explained" is associated with a third highest likelihood, and a fourth candidate edit including the word "explainer" is associated with a lowest likelihood. In some embodiments, edit generation model 212 can provide, as an additional output, an indication of the likelihood of the user accepting the candidate edit as a recommended edit 122 for the user-provided sentence. For example, edit generation model 212 can provide, for each of the set of candidate edits, a user acceptance rating or a user acceptance score indicating the likelihood of the user accepting the candidate edit (e.g., a highest rating for the first candidate edit, a second highest rating for the second candidate edit, a third highest rating for the third candidate edit, and a lowest rating for the fourth candidate edit).

In some embodiments, candidate edit engine 210 can provide each of the set of candidate edits, identified by edit generation model 212, to a language frequency model 214. Language frequency model 214 can be configured to determine a usage frequency for a particular word or phrase is used in a particular set of files (e.g., all electronic documents of an electronic document platform, all e-mail files of an electronic messaging platform, etc.). A usage frequency can correspond to a number of instances the particular word or phrase is used, or appears, in the particular set of files. In some embodiments, language frequency model 214 can be a trained machine learning model configured to receive, as an input, a particular word or phrase (e.g., form a candidate edit) and provide, as an output, an indication of a usage frequency for the particular word or phrase. For example, language frequency model 214 can provide, for each of the set of candidate edits, a usage frequency rating or a usage frequency score indicating a usage frequency for a corresponding candidate edit.

Edit accuracy engine 220 can be configured to determine a grammatical accuracy of each of the set of candidate edits identified by edit generation model 212. Edit accuracy engine 220 can include a grammar detection engine 310 and an edit accuracy model 224. Grammar detection engine 310 can be configured to detect one or more attributes corresponding to a grammar of a user-provided sentence. For example, grammar detection engine 310 can detect a dependency relationship (e.g., a semantic relationship, a syntactic relationship, etc.) between an identified word of the user-provided sentence (e.g., "explains") and one or more additional words of the user-provided sentence. Further details regarding grammar detection engine 310 are provided with respect to FIG. 3.

Edit accuracy engine 220 can determine the grammatical accuracy of each of the set of candidate edits based on an output provided by edit accuracy model 224. Edit accuracy model 224 can be configured to receive, as an input, an identified word from a user-provided sentence, a set of candidate edits corresponding to the identified word, and one or more attributes corresponding to a grammar of the user-provided sentence identified by grammar detection engine 310. For example, edit accuracy model 224 can receive, as an input, the identified word "explains," the set of candidate edits including at least "explain," "explains," "explained," "explainer," and a dependency relationship (e.g., a syntactical dependency relationship, a semantic dependency relationship, etc.) between the identified word "explains," and one or more additional words of the user-provided sentence. Edit accuracy model 224 can determine a grammatical accuracy of each candidate edit from the set of candidate edits in the user-provided sentence in view of the one or more grammar attributes (e.g., the syntactical and/or semantic dependency relationship between the identified word and the one or more additional words), and provide, as an output, an indication of the grammatical accuracy for each candidate edit. For example, edit accuracy model 224 can provide, for each of the set of candidate edits, an accuracy rating or an accuracy score indicating a grammatical accuracy for a corresponding candidate edit.

In response to edit accuracy engine 220 determining the grammatical accuracy for each of the set of candidate edits, grammar error correction engine 151 can select a recommended edit 122 for the user-provided sentence. In some embodiments, grammar error correction engine 151 can select a recommended edit 122 based on an accuracy rating or score for each of the set of candidate edits. For example, grammar error correction engine 151 can select a candidate edit associated with a highest accuracy rating or score as the recommended edit 122 for the user provided sentence. In other or similar embodiments, grammar error correction engine 151 can select a recommended edit 122 based on an accuracy rating or score for each of the set of candidate edits and at least one of a user acceptance rating (or score), or a usage frequency rating (or score) for each of the set of candidate edits, as determined by edit generation model 212 and language frequency model 214, respectively, in accordance with previously described embodiments. For example, grammar error correction engine 151 can determine, for each of the set of candidate edits, an overall rating based on an accuracy rating and at least one of a user acceptance rating and a usage frequency rating or a corresponding candidate edit. Grammar error correction engine 151 can select a candidate edit having a highest overall rating as a recommended edit 122 for a user-provided sentence.

In some embodiments, grammar error correction engine 151 can determine to remove one or more candidate edits from the set of candidate edits prior to selecting a recommended edit 122. For example, grammar error correction engine 151 can determine whether a grammatical accuracy for each of the set of candidate edits satisfies a grammatical accuracy criterion. In some embodiments, a grammatical accuracy can satisfy a grammatical accuracy criterion in response to a determination that the grammatical accuracy satisfies (i.e., meets or exceeds) a grammatical accuracy threshold value. If one or more particular candidate edits does not satisfy the grammatical accuracy criterion, grammar error correction engine 151 can remove the particular candidate edits from the set of candidate edits. Grammar error correction engine 151 can select the recommended edit 122 from the remaining set of candidate edits, in accordance with previously described embodiments. In some instances, no candidate edit of the set of candidate edits are associated with a grammatical accuracy that satisfies the grammatical accuracy criterion. In such instances, grammar error correction engine 151 can provide a recommendation that no recommended edit 122 is to be made to the user-provided sentence (i.e., the originally provided word in the user-provided sentence is grammatically accurate).

Figure 3:
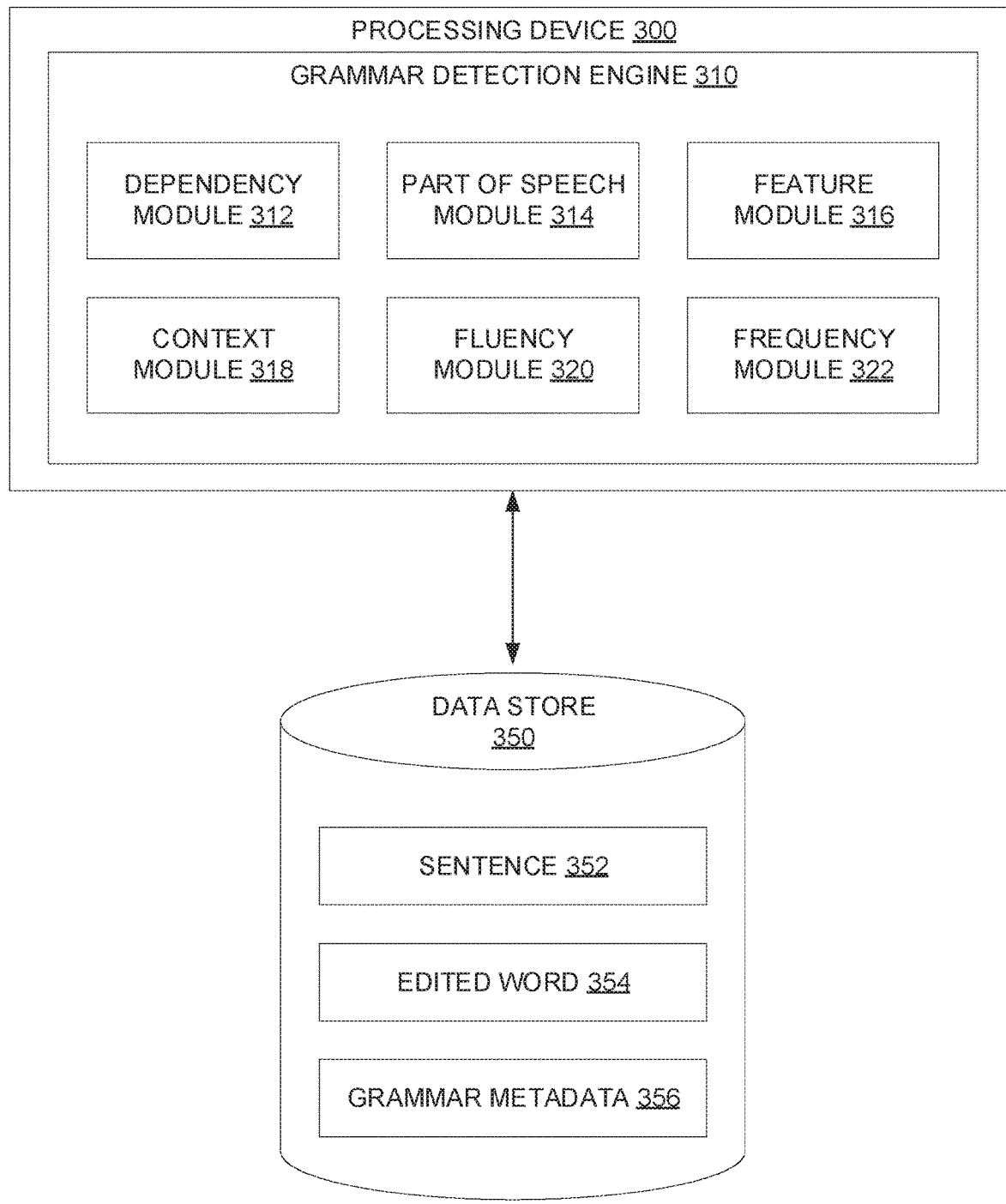
FIG. 3 is a block diagram illustrating a grammar detection engine, in accordance with implementations of the present disclosure.

FIG. 3 is a block diagram illustrating a grammar detection engine 310, in accordance with implementations of the present disclosure. In some embodiments, grammar detection engine 310 can correspond to grammar detection engines 310 of FIG. 1 and/or FIG. 2. As illustrated in FIG. 3, grammar detection engine 310 may be a component of a computing apparatus that includes a processing device 300 coupled to a data store 350. In some embodiments, data store 350 can be included in data store 110 of FIG. 1. Processing device 300 may be configured to execute grammar detection engine 310. Processing device 300 can correspond to server machines 130, 140, or 150, platform 120, or client device 102 of FIG. 1. Data store 350 can be a part of a memory corresponding to volatile memory 704 and/or non-volatile memory 706, as described with respect to FIG. 7.

Grammar detection engine 310 can be configured to detect one or more attributes corresponding to a grammar of a sentence 352. In some embodiments, sentence 352 can be a sentence provided by a user of platform 120, such as sentence 400 of FIG. 4A. In other or similar embodiments, sentence 352 can be a previously corrected sentence, such as a previously corrected sentence that is used to train a machine learning model (e.g., edit accuracy model 224), as described with respect to FIG. 1.

Grammar detection engine 310 can include a dependency module 312, a part of speech (POS) module 314, a feature module 316, a context module 318, a fluency module 320, and a frequency module 322. Each module of grammar detection engine 310 can be configured to detect one or more distinct attributes corresponding to the grammar of sentence 352. Grammar detection engine 310 can be configured to store data associated with each of the one or more detected attributes as grammatical attributes 356. In some embodiments, grammatical attributes 356 can be stored in a data structure, such as data structure 450 illustrated in FIG. 4B. Data structure 450 can include one or more entries each associated with a particular word of a sentence, such as sentence 400. Although only the word "explains" is included in an entry of data structure 450, data structure 450 can include an entry corresponding to each word of a sentence, in accordance with embodiments described herein.

Dependency module 312 can be configured to identify a dependency relationship (i.e. a syntactic and/or a semantic relationship) between a word of sentence 352 and one or more additional words of sentence 352. A dependency relationship refers to a relationship between a parent dependency word and a child dependency word of a particular sentence. A parent dependency word and a child dependency word share at least one or more syntactic properties (i.e., a form or structure of a word based on a syntax of the sentence) or one or more semantic properties (i.e., a form or structure of a word based on a meaning of the sentence). A parent dependency word controls at least a form or structure of the child dependency word based on the one or more shared syntactic and/or semantic properties. For a particular word of a sentence, dependency module 312 can identify a parent dependency word and/or a child dependency word associated with the particular word. In some embodiments, a child dependency word can be a word that surrounds (i.e., is immediately adjacent to) a parent dependency word. In other or similar embodiments, a child dependency word can be a word that does not surround (i.e., is not immediately adjacent to) a parent dependency word. A child dependency word can be identified for a parent dependency word irrespective of a proximity of the child dependency word to the parent dependency word, in embodiments of the present disclosure.

Referring to sentence 400 of FIG. 4, a first word of sentence 400 can be "explains." In one example, "explains" can be a child dependency word of a first dependency relationship with the parent dependency word "lists." As a result of the first dependency relationship, the word "lists," given at least the syntax or the meaning of sentence 400, controls at least the form or structure of the word "explains" in sentence 400. In another example, "explains" can be a parent dependency word of a second dependency relationship with the child dependency word "need." As a result of the second dependency relationship, the word "explains" controls at least the form or structure of the word "need" in sentence 400.

In some embodiments, dependency module 312 can generate a dependency label indicating a dependency status (e.g., parent or child) within the dependency relationship. As illustrated in FIG. 4A, dependency module 312 can generate a parent dependency label 402A for the word "lists," in view of the first dependency relationship, and a parent dependency label 402B for the word "explains," in view of the second dependency relationship. Similarly, dependency module 312 can generate a child dependency label 404A for the word "explains," in view of the first dependency relationship and a child dependency label 404B for the word "need," in view of the second dependency relationship. Grammar detection engine 310 can store each dependency label generated by dependency module 312 as grammatical attributes 356 at data store 350. In some embodiments, grammar detection engine 310 can store each dependency label in a particular entry of data structure 450 for a corresponding word, as illustrated in FIG. 4B.

In some embodiments, dependency module 312 can also generate a pointer between a parent dependency word and a child dependency word indicating the dependency relationship between the parent dependency word and the child dependency word. As illustrated in FIG. 4., dependency module 312 can generate a first pointer between parent dependency word "lists" and child dependency word "explains," in view of the first dependency relationship. Dependency module 312 can also generate a second pointer between parent dependency word "explains" and child dependency word "need," in view of the second dependency relationship. Grammar detection engine 310 can store each pointer generated by dependency module 312 as grammatical attributes 356 at data store 350. Grammar detection engine 310 can store each pointer in a particular entry of a data structure 450 for a corresponding word, as illustrated in FIG. 4B.

In some embodiments, dependency module 312 can also determine grammatical accuracy of a dependency relationship between a parent dependency word and a child dependency word. Dependency module 312 can determine a grammatical accuracy of a dependency relationship by determining one or more grammatical syntactic and/or semantic rules associated with the dependency relationship are satisfied. Dependency module 312 can store an indication of whether a dependency relationship is accurate as a grammatical attribute 356. For example, dependency module 312 can store the indication that a dependency relationship is grammatically accurate in a particular entry of data structure 450 for a corresponding word, as illustrated in FIG. 4B.

POS module 314 can be configured to identify a part of speech associated with each word of the sentence 352. A part of speech for a word refers to a particular category of words (e.g., a noun, a verb, an adjective, etc.) for which the word is assigned to, in accordance with a syntactic property associated with the word. For each word of sentence 352, POS module 314 can determine a syntactic property associated with the corresponding word and generate a POS label for the corresponding word in view of the syntactic property. As illustrated in FIG. 4, POS module 314 can determine a syntactic property associated with the word "lists" and generate a first POS label 408A indicating that the word "lists" is a verb, in view of the determined syntactic property. Similarly, POS module 314 can generate a second POS label 408B indicating that the word "explains" is a verb, and a third POS label 408C indicating that the word "need" is a noun, in view of a syntactic property determined for "explains" and "need." Grammar detection engine 310 can store each POS label associated with a particular word generated by dependency module 314 as a grammatical attribute 356 at data store 350. In some embodiments, grammar detection engine 310 can store each POS label in a particular entry of a data structure 450 for a corresponding word, as illustrated in FIG. 4B.

Feature module 316 can be configured to detect one or more additional grammatical features associated with each word of a sentence 352. For example, feature module 316 can be configured to detect a gender, a grammatical number, a tense, etc. associated with a particular word. For each word of sentence 352, feature module 316 can determine one or more grammatical features associated with the corresponding word and generate a feature label for the corresponding word. As illustrated in FIG. 4A, feature module 316 can determine one or more grammatical features associated with the word "lists" and generate a first feature label 410A indicating that the word "lists" is plural. Similarly, feature module 316 can generate a second feature label 410B indicating that the word "explains" is singular, and a third feature label 410C indicating that the word "need" is singular. Although FIG. 4A illustrates a single feature label for each word "lists," explains," and "need," it should be noted that feature module 316 can generate any number of feature labels for each word of a sentence (e.g., indicating a gender, a tense, etc.). Grammar detection engine 310 can store each feature label associated with a particular word generated by dependency module 314 as grammatical attributes 356 at data store 350. In some embodiments, grammar detection engine 310 can store each feature label in a particular entry of a data structure 450 for a corresponding word, as illustrated in FIG. 4B.

Context module 318 can be configured to determine a context of a particular word of sentence 352 in view of one or more additional words in immediate proximity of the particular word. A context can refer to a meaning of a particular word in view of one or more words immediately surrounding the particular word. For example, as illustrated in FIG. 4A, a context for the word "explains" can be determined in view of the words "briefly" and "their," which immediately surround the word "explains." Context module 318 can determine a context for a set of words is grammatically accurate by determining whether the sentence 352 satisfies one or more grammatical rules associated with the semantic context. In some embodiments, context module 318 can determine whether the context is grammatically accurate based on a POS label or a feature label associated with one or more words of sentence 352. Grammar detection engine 310 can store an indication of whether the context of a word is grammatically accurate as a grammatical attribute 356 at data store 350. In some embodiments, grammar detection engine 310 can store the indication that the sentence is grammatically accurate in view of the context in a particular entry of data structure 450 for a corresponding word, as illustrated in FIG. 4B.

Fluency module 320 can be configured to detect fluency of a sentence 352 that includes a particular word. A fluency of a sentence 352 can refer to a commonly accepted phrasing of a sentence 352. Fluency module 320 can compare a particular phrasing of sentence 352 to other sentences included in a particular set of files (e.g., a set of files of a document editing platform, a set of files of an e-mail platform, etc.) to determine whether the phrasing a sentence 352 including a particular word is fluent. Grammar detection engine 310 can store an indication of a fluency of sentence 352 (i.e., whether sentence 352 is fluent or is not fluent) in view of the particular word as a grammatical attribute 356 at data store 350. In some embodiments, grammar detection engine 310 can store the indication of a fluency of sentence 352 in view of the particular word in a particular entry of data structure 450 for the particular word, as illustrated in FIG. 4B.

Frequency module 322 can be configured to determine a frequency that a word or set of words is used in combination with one or more additional words of sentence 352. In some embodiments, the additional words can be determined based on a dependency relationship between the word and the one or more additional words. For example, with respect to sentence 400, frequency module 322 can determine a usage frequency of the word "explains" as used in combination with "lists" and "need." Frequency module 322 can determine a usage frequency for a particular word or phrase including the particular word in the particular set of files (e.g., a set of documents of a document editing platform, a set of documents of an e-mail platform, etc.). The usage frequency can correspond to a number of instances the particular word or phrase is used, or appears in the particular set of files. In some instances, frequency module 322 can determine the usage frequency in accordance with previously described embodiments, (i.e., in accordance with embodiments described with respect to language frequency model 214 of FIG. 2). Grammar detection engine 310 can store a usage frequency for a particular word of sentence 352 as a grammatical attribute 356 stored at data store 350. In some embodiments, grammar detection engine 310 can store the usage frequency for a particular word in a particular entry of data structure 450 for the particular word, as illustrated in FIG. 4B.

As described above, grammar detection engine 310 can detect the previously provided grammatical attributes for one or more words of a sentence (e.g., sentence 400 or previously corrected sentence described with respect to FIG. 1). In some embodiments, grammar detection engine 310 can further detect the previously provided grammatical attributes for one or more edited words not included in the sentence 352. In some embodiments, the edited word can include each word of a candidate edit described with respect to FIG. 2. In other or similar embodiments, the edited word can include one or more words used to replace a word in a previously corrected sentence. Grammar detection engine 310 can store attributes detected for each edited word as grammatical attributes 356 stored at data store 350. In some embodiments, grammar detection engine 310 can store detected attributes for edited words 354 in a particular entry of data structure 450 for the particular edited word 354. As illustrated in FIG. 4B, grammar detection engine 310 can detect the one or more grammatical attributes for the word "explains" in sentence 400 and store the attributes in an entry for the word "explains" in data structure 450. Grammar detection engine 310 can also detect the one or more grammatical attributes for each candidate edit for the word "explains" (i.e., "explain," "explained," and "explainer," as described with respect to FIG. 2) and store each detected grammatical attribute in an entry for each candidate edit in data structure 450.

In some embodiments, grammar detection engine 310 can detect one or more additional grammatical attributes for a sentence 352 and/or an edited word 354. For example, grammar detection engine 310 can select one or more words of sentence 352 and determine one or more alternative combinations of the selected words in the sentence 352. Grammar detection engine 310 can then determine one or more grammatical attributes associated with the alternative combinations of the selected words and store the grammatical attributes in data store 350, in accordance with previously described embodiments. In another example, grammar detection engine 310 can determine similarity (e.g., structural similarity, contextual similarity, etc.) between a word of sentence 352 and edited word 354. Grammar detection engine 310 can store an indication of the similarity as a grammatical attribute in data store 350, in accordance with previously described embodiments.

Referring back to FIG. 1, training data generator 131 can use grammar detection engine 310 to generate training data for training a machine learning model, such as edit accuracy model 224. As described previously, training data generator 131 can generate training data to train the edit accuracy model 224 using previously corrected sentences stored at data store 110. In some instances, the previously corrected sentence can be provided by an accepted linguistic authority (e.g., a professional linguist). Training data generator 131 can obtain one or more grammatical attributes for the previously corrected sentence, in accordance with previously described embodiments. Training set generator 131 can generate a first subset of training inputs, which can include a portion of an original sentence prior to the original sentence being corrected, an edit made to the previously corrected sentence, and the one or more grammatical attributes of the previously corrected sentence (e.g., a dependency relationship between a word in the portion being corrected and two or more surrounding words). A first subset of target outputs for the first subset of training inputs can include an indication that the edit made to the previously corrected sentence is grammatically accurate (i.e., as the edit was made by an accepted linguistic authority). The first subset of training inputs and the first subset of target outputs can be provided to train the edit accuracy model 224, in accordance with previously described embodiments.

In some embodiments, training data generator 131 can provide the original, uncorrected sentence to candidate edit engine 210. In some instances, edit generation model 212 can provide a set of candidate edits for the original, uncorrected sentence. A first candidate edit of the set of candidate edits can correspond to the edit made to the sentence by the accepted linguistic authority, while at least a second candidate edit is different from the edit made to the sentence by the accepted linguistic authority. Training data generator 131 can obtain one or more grammatical attributes associated with the original sentence and the second candidate edit of the set of candidate edits, in accordance with previously described embodiments. Training data generator 131 can generate a second subset of training inputs including the portion of the original, uncorrected sentence prior, the second candidate edit of the set of candidate edits, and the one or more grammatical attributes of the previously corrected sentence in view of the second candidate edit. Training data generator 131 can generate a second subset of target outputs for the second subset of training inputs, which includes that the second candidate edit is not grammatically accurate to correct the corrected sentence (i.e., as the edit was not made by the accepted linguistic authority). The first subset of training inputs and the first subset of target outputs can be provided to train the edit accuracy model 224, in accordance with previously described embodiments.

As discussed previously, training data generator 131 can use grammar detection engine 310 to generate training data based on previously corrected user-provided sentences. Training data generator 131 can generate training data based on previously corrected user-provided sentences, in accordance with previously described embodiments.

Referring back to FIG. 2, edit accuracy engine 220 can use grammar detection engine 310 to detect one or more grammar attributes associated with a word of a user-provided sentence, as identified by candidate edit engine 210, and each of a set of candidate edits, as identified by edit generation model 212. Edit accuracy engine 220 can provide the word of the user-provided sentence, the detected one or more grammar attributes associated with the word of the user-provided sentence, each of the set of candidate edits, and one or more grammar attributes associated with each of the set of candidate edits as input to edit accuracy model 224. As described previously, edit accuracy model 224 can provide, as an output, a grammatical accuracy of each candidate edit from the set if candidate edits in view of the one or more grammar attributes associated with the user-provided word and the candidate edits.

Figure 5:
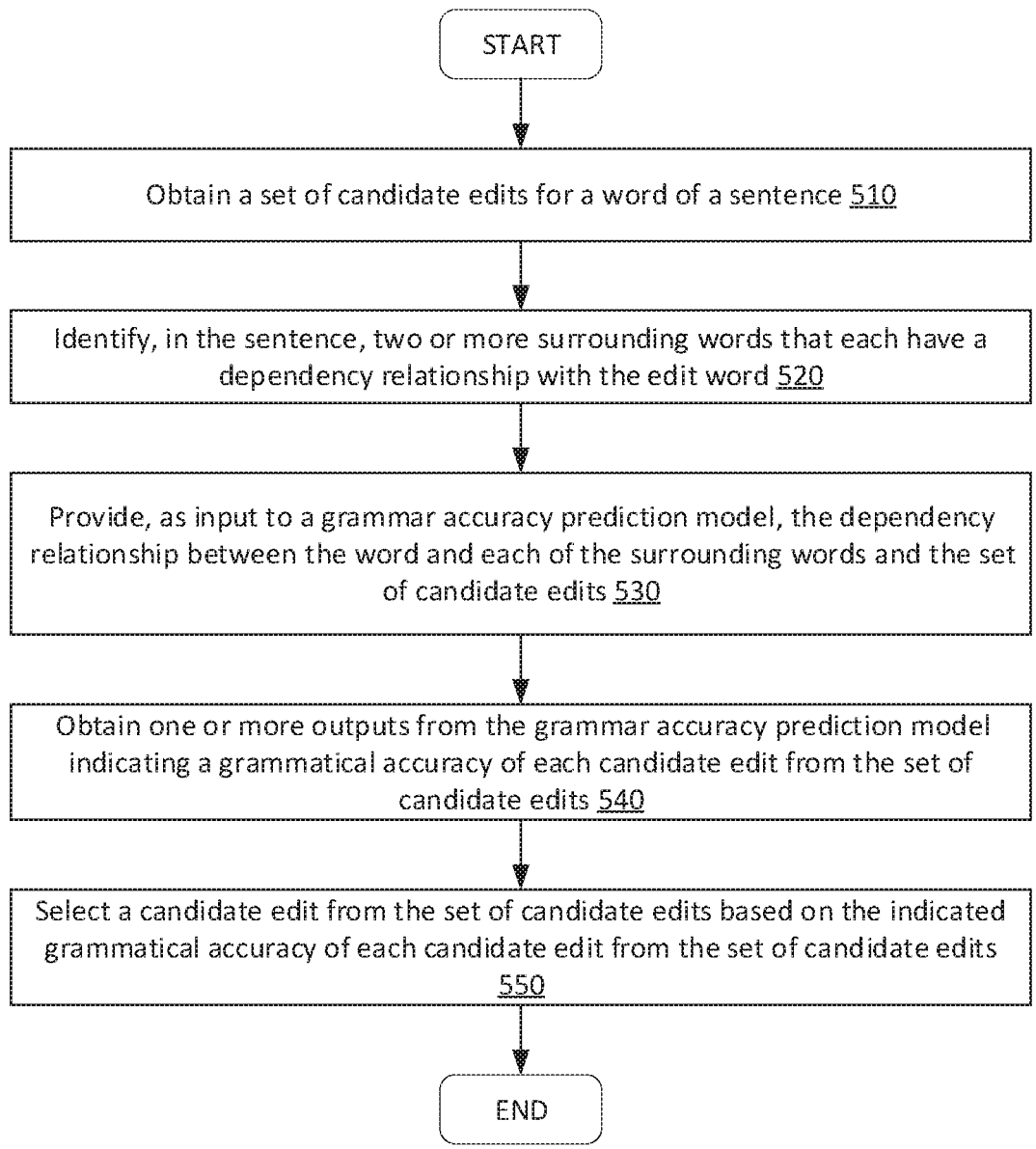
FIG. 5 depicts a flow diagram of a method to re-evaluate grammar suggestions from a machine translation model, in accordance with implementations of the present disclosure.
Figure 6:
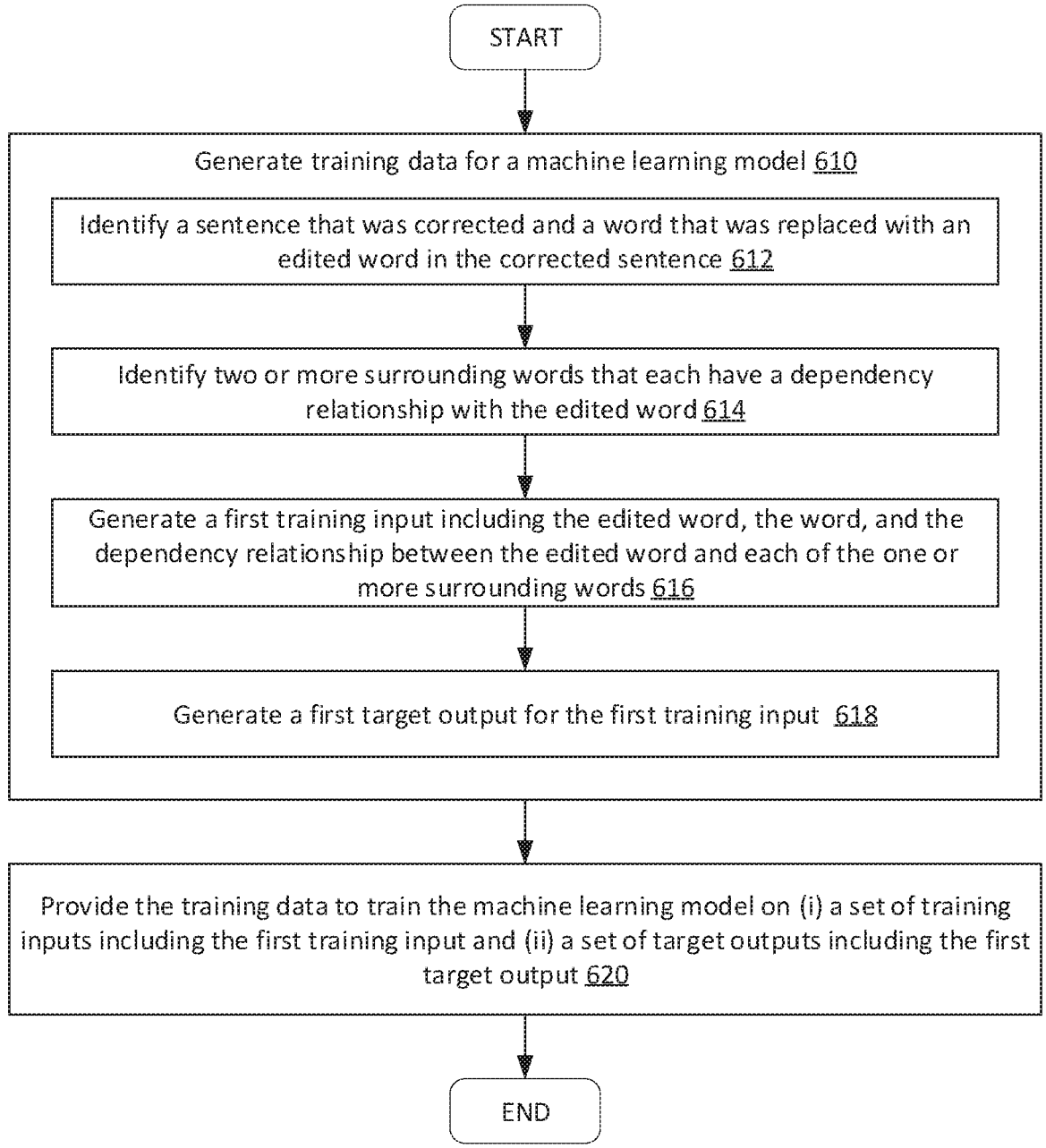
FIG. 6 depicts a flow diagram of a method for training a machine learning model used to re-evaluate grammar suggestions from a machine translation model, in accordance with implementations of the present disclosure.

FIG. 5 depicts a flow diagram of a method 500 to re-evaluate grammar suggestions from a machine translation model, in accordance with implementations of the present disclosure. FIG. 6 depicts a flow diagram of a method 600 to train a machine learning model used to re-evaluate grammar suggestions from a machine translation model, in accordance with implementations of the present disclosure. Methods 500 and 600 may be performed by processing logic that may include hardware (circuitry, dedicated logic, etc.), software (e.g., instructions run on a processing device), or a combination thereof. In one implementation, some or all the operations of methods 500 and 600 may be performed by one or more components of system 100 of FIG. 1.

Referring now to FIG. 5, at block 510, the processing device obtains a set of candidate edits for a word of a sentence. The sentence can be a sentence provided by a user of platform 120, described with respect to FIG. 1. In some embodiments, each of the set of candidate edits can include an edit word. The processing device can obtain the set of candidates from candidate edit engine 210 of FIG. 2, in accordance with previously described embodiments. For example, the processing device can provide, as an input to an edit generation model (e.g., edit generation model 212), the word of the sentence. The edit generation model can be configured to identify, for a given word, one or more potential corrected forms of the given word. The processing device can obtain, as one or more second outputs from the edit generation model, the set of candidate edits for the word. The edit word of each of the set of candidate edits can correspond to a potential corrected form of the word. At block 520, the processing device identifies, in the sentence, two or more surrounding words that each have a semantic dependency relationship and a syntactic dependency relationship with the edit word. In some embodiments, the processing device identifies at least one of the two or more surrounding words irrespective of proximity of a corresponding surrounding word to the first word. The processing device can identify the two or more surrounding words that have the dependency relationship with the edit word using a grammar detection engine, such as grammar detection engine 310 described with respect to FIG. 3. In some embodiments, the processing device can identify the set of surrounding words that each have the semantic dependency relationship and the syntactic dependency relationship by determining, based on at least a semantic of the sentence, that the edited word and each of the set of surrounding words are to have a shared semantic property, and determining, based on at least a syntax of the sentence, that the edit word and each of the set of surrounding words are to have a shared syntactic property.

In some embodiments, the processing device can identify other grammatical attributes associated with the edit word and/or the sentence. For example, the processing device can identify a part of speech identifier for each word in the sentence. In another example, the processing device can identify a context relationship between the edit word and one or more additional words of the sentence. In such example, each of the one or more additional words is identified based on an immediate proximity of a corresponding additional word to the edit word in the sentence.

At block 530, the processing device provides, as input to a trained machine learning model, the semantic dependency relationship and the syntactic dependency relationship between the first word and each of the surrounding words, and the set of candidate edits. In some embodiments, the trained machine learning model can be a grammatical accuracy prediction model, such as edit accuracy model 224 of FIG. 2. In some embodiments, the processing device can provide one or more additional grammatical attributes associated with the edit word and/or the sentence as additional input to the trained machine learning model. For example, the processing device can provide a part of speech identifier for each word of the sentence to the trained machine learning model. In another example, the processing device can provide the context relationship between the edit word and the one or more additional words to the trained machine learning model.

At block 540, the processing device obtains one or more outputs from the trained machine learning model indicating a grammatical accuracy of each candidate edit from the set of candidate edits. In some embodiments, the one or more outputs from the trained machine learning model indicate a grammatical accuracy of each candidate edit in view of the semantic dependency relationship and the syntactic dependency relationship between the edit word and each of the surrounding words.

At block 550, the processing device selects a candidate edit from the set of candidate edits based on the indicated grammatical accuracy of each candidate edit from the set of candidate edits. In some embodiments, the processing device can provide each of the set of candidate edits for the edit word of the sentence to a language frequency model, such as language frequency model 214. The processing device can obtain one or more third outputs from the language frequency model that indicate a frequency the edit word of each of the set of candidate edits are used in a particular set of files. In such embodiments, the processing device can select the candidate edit from the set of candidate edits based on the frequency each edit word of each of the set of candidate edits is used in the particular set of files.

In some embodiments, the processing device can remove one or more candidate edits from the set of candidate edits. For example, the processing device can determine whether the indicated grammatical accuracy of each candidate edit from the set of candidate edits satisfies a grammatical accuracy criterion. In response to determining a corresponding grammatical accuracy for one or more particular candidate edits do not satisfy the grammatical accuracy criterion, the processing device can remove the one or more particular candidate edits from the set of candidate edits.

As discussed above, FIG. 6 depicts a flow diagram of a method 600 for training a machine learning model to select a recommended edit for a user-provided sentence based on a grammatical accuracy of each of a set of candidate edits, in accordance with implementations of the present disclosure.

At block 610, the processing device generates training data for a machine learning model. The machine learning model can be a grammar accuracy prediction model, such as edit accuracy model 224 of FIG. 2. In some embodiments, the processing device generates training data for the machine learning model in accordance with operations performed at blocks 512-518 of method 600.

At block 612, the processing device identifies a sentence that was corrected and a word that was replaced with an edited word in the corrected sentence. In some embodiments, the processing device can identify the sentence from a set of previously corrected sentences provided by a linguistic authority entity (e.g., a professional linguist). In other or similar embodiments, the processing device can identify a sentence from a set of previous user-provided sentences (i.e., to platform 120).

At block 614, the processing device identifies two or more surrounding words that each have a semantic dependency relationship and a syntactic dependency relationship with the edited word. In some embodiments, at least one of the two or more surrounding words is identified irrespective of proximity of a corresponding surrounding word to the edited word. The processing device can identify the two or more surrounding words, in accordance with embodiments described with respect to FIG. 3. For example, the processing device can identify the set of surrounding words that each have the semantic dependency relationship and the syntactic dependency relationship by determining, based on at least a semantic of the sentence, that the edited word and each of the set of surrounding words are to have a shared semantic property, and determining, based on at least a syntax of the sentence, that the edit word and each of the set of surrounding words are to have a shared syntactic property.

In some embodiments, the processing device can identify other grammatical attributes associated with the edit word and/or the sentence. For example, the processing device can identify a part of speech identifier for each word in the sentence. In another example, the processing device can identify a context relationship between the edit word and one or more additional words of the sentence. In such example, each of the one or more additional words is identified based on an immediate proximity of a corresponding additional word to the edit word in the sentence.

At block 616, the processing device generates a first training input including the edited word, the word, and the semantic dependency relationship and the syntactic dependency relationship between the edited word and each of the set of surrounding words. In some embodiments, the generated first training input can further include one or more grammatical attributes for the edited word and/or the sentence. For example, the generated first training input can include a part of speech identifier for each word of the corrected sentence. In another example, the generated first training input can include the context relationship between the edited word and the one or more additional words of the sentence.

In some embodiments, the training input including the semantic dependency relationship and the syntactic dependency relationship between the edited word and each of the set of surrounding words includes at least one of a dependency status label for each of the edited word and the set of surrounding words. The dependency status label indicates a status of a particular word in the semantic dependency relationship and the syntactic dependency relationship. The dependency status label can further, or alternatively, include a pointer indicating the semantic dependency relationship and the syntactic dependency relationship between the edited word and each of the set of surrounding words.

At block 618, the processing device generates a first target output for the first training input. The target output can include an indication of whether the edited word in the corrected sentence is grammatically accurate in view of the semantic dependency relationship and the syntactic dependency relationship between the edited word and each of the one or more surrounding words.

At block 620, the processing device provides the training data to train the machine learning model on (i) a set of training inputs including the first training input and (ii) a set of target outputs including the first target output. In some embodiments, each training input of the set of training inputs is mapped to a target output of the set of target outputs.

Figure 7:
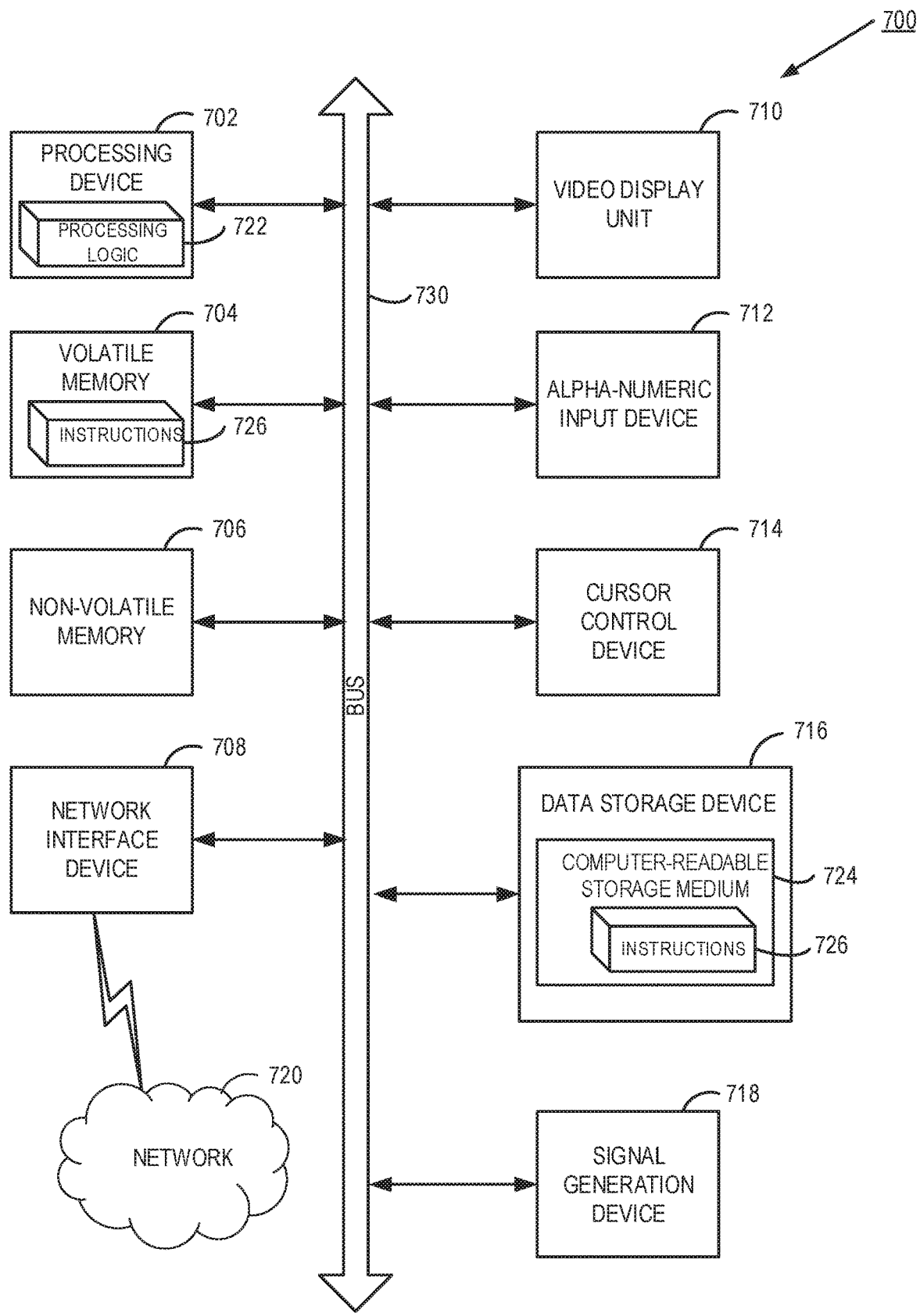
FIG. 7 is a block diagram illustrating an exemplary computer system, in accordance with implementations of the present disclosure.

FIG. 7 is a block diagram illustrating an exemplary computer system 700, in accordance with implementations of the present disclosure. The computer system 700 can be the server machine 130 or platform 120 in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 740.

Processor (processing device) 702 represents one or more general-purpose processing devices such as a microprocessor, central processing unit, or the like. More particularly, the processor 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 can also be one or more special-purpose processing devices such as an application specific integrated circuit (ASIC), a field programmable gate array (FPGA), a digital signal processor (DSP), network processor, or the like. The processor 702 is configured to execute instructions 705 (e.g., for predicting channel lineup viewership) for performing the operations discussed herein.

The computer system 700 can further include a network interface device 708. The computer system 800 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 720 (e.g., a speaker).

The data storage device 718 can include a non-transitory machine-readable storage medium 724 (also computer-readable storage medium) on which is stored one or more sets of instructions 705 (e.g., for correcting one or more grammatical errors in a user provided sentence) embodying any one or more of the methodologies or functions described herein. The instructions can also reside, completely or at least partially, within the main memory 704 and/or within the processor 702 during execution thereof by the computer system 700, the main memory 704 and the processor 702 also constituting machine-readable storage media. The instructions can further be transmitted or received over a network 730 via the network interface device 708.

In one implementation, the instructions 705 include instructions for predicting channel lineup viewership. While the computer-readable storage medium 724 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collected data is anonymized prior to performing any analysis to obtain any statistical patterns so that the identity of the user cannot be determined from the collected data.

What is claimed is:

1. A method comprising
obtaining a set of candidate edits for a word of a sentence, wherein each of the candidate edits comprises an edit word;
determining a semantic dependency relationship and a syntactic dependency relationship between the edit word and each of a set of surrounding words in the sentence, wherein the semantic dependency relationship and the syntactic dependency relationship is determined for at least one of the set of surrounding words irrespective of proximity to the edit word;
providing, as input to a grammar accuracy prediction model, the semantic dependency relationship and the syntactic dependency relationship between the edit word and each of the set of surrounding words for the set of candidate edits;
obtaining one or more first outputs from the grammar accuracy prediction model, wherein the one or more first outputs indicate a grammatical accuracy of each candidate edit from the set of candidate edits in the sentence in view of the semantic dependency relationship and the syntactic dependency relationship between the edit word and each of the set of surrounding words; and
selecting a candidate edit from the set of candidate edits based on the indicated grammatical accuracy of each candidate edit from the set of candidate edits in the sentence.

2. The method of claim 1, wherein obtaining the set of candidate edits for the word of the sentence comprises:
providing, as an input to an edit generation model, the word of the sentence, wherein the edit generation model is configured to identify, for a given word, one or more potential corrected forms of the given word; and
obtaining, as one or more second outputs from the edit generation model, the set of candidate edits for the word, wherein the edit word of each of the set of candidate edits corresponds to a potential corrected form of the word.

3. The method of claim 1, wherein determining the semantic dependency relationship and the syntactic dependency relationship between the edit word and each of the set of surrounding words in the sentence comprises:
determining, based on at least a semantic of the sentence, that the edit word and each of the set of surrounding words are to have a shared semantic property; and
determining, based on at least a syntax of the sentence, that the edit word and each of the set of surrounding words are to have a shared syntactic property.

4. The method of claim 1, further comprising:
identifying at least one of a part of speech identifier for each word of the sentence or a context relationship between the edit word and one or more additional words of the sentence, wherein each of the one or more additional words is identified based on an immediate proximity of a corresponding additional word to the edit word in the sentence; and
providing, as additional input to the grammar accuracy prediction model, at least one of the part of speech identifier for each word of the sentence or the context relationship between the edit word and the one or more additional words.

5. The method of claim 1, further comprising:
providing, as an input to a language frequency model, each of the set of candidate edits for the edit word of the sentence; and
obtaining one or more third outputs from the language frequency model, wherein the one or more third outputs indicate a frequency the edit word of each of the set of candidate edits is used in a particular set of files.

6. The method of claim 5, wherein selecting the candidate edit from the set of candidate edits is further based on the frequency each edit word of each of the set of candidate edits is used in the particular set of files.

7. The method of claim 1, further comprising:
determining whether the indicated grammatical accuracy of each candidate edit from the set of candidate edits satisfies a grammatical accuracy criterion; and
responsive to determining a corresponding grammatical accuracy for one or more particular candidate edits do not satisfy the grammatical accuracy criterion, removing the one or more particular candidate edits from the set of candidate edits.

8. A method for training a grammar accuracy prediction model to determine accuracy of suggested edits to contents of a document, the method comprising:
generating training data for the grammar accuracy prediction model, wherein generating the training data comprises:
identifying a sentence that was corrected and a word that was replaced with an edited word in the corrected sentence;
determining, a semantic dependency relationship and a syntactic dependency relationship between the edited word and each of a set of surrounding words in the corrected sentence, wherein the semantic dependency relationship and the syntactic dependency relationship is determined for at least one of the set of surrounding words irrespective of proximity of a corresponding surrounding word to the edited word;
generating a first training input comprising the edited word, the edit word and the semantic dependency relationship and the syntactic dependency relationship between the edited word and each of the set of surrounding words; and
generating a first target output for the first training input, wherein the first target output comprises an indication of whether the edited word in the corrected sentence is grammatically accurate in view of the semantic dependency relationship and the syntactic dependency relationship between the edited word and each of the set of surrounding words; and
providing the training data to train the grammar accuracy prediction model on (i) a set of training inputs comprising the first training input and (ii) a set of target outputs comprising the first target output.

9. The method of claim 8, wherein the sentence that was corrected is identified from a sentence database comprising one or more previously corrected sentences, wherein each of the one or more previously corrected sentences were corrected by at least one of an accepted linguistic authority entity or a user of a platform.

10. The method of claim 8, wherein determining the semantic dependency relationship and the syntactic dependency relationship between the edited word and each of the set of surrounding words in the sentence comprises:
- determining, based on at least a semantic of the sentence, that the edit word and each of the set of surrounding words are to have a shared semantic property; and
- determining, based on at least a syntax of the sentence, that the edited word and each of the set of surrounding words have a shared syntactic property.

11. The method of claim 8, wherein generating training data for the grammar accuracy prediction model further comprises:
- identify at least one of a part of speech identifier for each word of the corrected sentence or a context relationship between the edited word and one or more additional words of the sentence, wherein each of the one or more additional words is identified based on an immediate proximity of a corresponding additional word to the edited word in the sentence,
- wherein the generated first training input further comprises at least one of the part of speech identifier for each word of the corrected sentence or the context relationship between the edited word and the one or more additional words of the sentence.

12. The method of claim 8, wherein the training input comprising the semantic dependency relationship and the syntactic dependency relationship between the edited word and each of the set of surrounding words includes at least one of a dependency status label for each of the edited word and the set of surrounding words, wherein the dependency status label indicates a status of a particular word in the semantic dependency relationship and the syntactic dependency relationship or a pointer indicating the semantic dependency relationship and the syntactic dependency relationship between the edited word and each of the set of surrounding words.

13. The method of claim 8, wherein each training input of the set of training inputs is mapped to a target output of the set of target outputs.

14. A system comprising:
- a memory component; and
- a processing device communicatively coupled to the memory component, the processing device to:
  - obtain a set of candidate edits for a first word of a sentence, wherein each of the candidate edits comprises an edit word;
  - determine, a semantic dependency relationship and a syntactic dependency relationship between the edit word and each of a set of surrounding words in the sentence, wherein the semantic dependency relationship and the syntactic dependency relationship is determined for at least one of the set of surrounding words is identified irrespective of proximity of a corresponding surrounding word to the edit word;
  - provide, as input to a grammar accuracy prediction model, the semantic dependency relationship and the syntactic dependency relationship between the edit word and each of the surrounding words and the set of candidate edits;
  - obtain one or more first outputs from the grammar accuracy prediction model, wherein the one or more first outputs indicate a grammatical accuracy of each candidate edit from the set in the sentence in view of the semantic dependency relationship and the syntactic dependency relationship between the edit word and each of the set of surrounding words; and
  - select a candidate edit from the set of candidate edits based on the indicated grammatical accuracy of each candidate edit from the set in the sentence.

15. The system of claim 14, wherein to obtain the set of candidate edits for the word of the sentence, the processing device is to:
- provide, as an input to an edit generation model, the word of the sentence, wherein the edit generation model is configured to identify, for a given word, one or more potential corrected forms of the given word; and
- obtain, as one or more second outputs from the edit generation model, the set of candidate edits for the word, wherein the edit word of each of the set of candidate edits corresponds to a potential corrected form of the word.

16. The system of claim 14, wherein to determine the semantic dependency relationship and the syntactic dependency relationship between the first word and each of the set of surrounding words in the sentence, the processing device is to:
- determine, based on at least a semantic of the sentence, that the edit word and each of the set of surrounding words are to have a shared semantic property; and
- determine, based on at least a syntax of the sentence, that the edit word and each of the set of surrounding words are to have a shared syntactic property.

17. The system of claim 14, wherein the processing device is further to:
- identify at least one of a part of speech identifier for each word of the sentence or a context relationship between the edit word and one or more additional words of the sentence, wherein each of the one or more additional words is identified based on an immediate proximity of a corresponding additional word to the edit word in the sentence; and
- provide, as additional input to the grammar accuracy prediction model, at least one of the part of speech identifier for each word of the sentence or the context relationship between the edit word and the one or more additional words.

18. The system of claim 14, wherein the processing device is further to:
- provide, as an input to a language frequency model, each of the set of candidate edits for the edit word of the sentence; and
- obtain one or more third outputs from the language frequency model, wherein the one or more third outputs indicate a frequency the edit word of each of the set of candidate edits are used in a particular set of files.

19. The system of claim 18, where the processing device is to select the candidate edit from the set of candidate edits is further based on the frequency each edit word of each of the set of candidate edits are used in the particular set of files.

20. The system of claim 14, wherein the processing device is further to:
- determine whether the indicated grammatical accuracy of each candidate edit from the set of candidate edits satisfies a grammatical accuracy criterion; and
- responsive to determining a corresponding grammatical accuracy for one or more particular candidate edits do not satisfy the grammatical accuracy criterion, remove the one or more particular candidate edits from the set of candidate edits.

* * * * *